United States Patent [19]

Corona et al.

[11] Patent Number: 5,047,954

[45] Date of Patent: Sep. 10, 1991

[54] GRAPHICS VECTOR GENERATOR SETUP TECHNIQUE

[75] Inventors: James Corona, Kingston; Terence W. Lindgren, Rosendale, both of N.Y.

[73] Assignee: International Business Machines Corporation, Armonk, N.Y.

[21] Appl. No.: 425,494

[22] Filed: Oct. 17, 1989

Related U.S. Application Data

[63] Continuation of Ser. No. 820,763, Jan. 17, 1986, abandoned.

[51] Int. Cl.[5] .............................................. G06F 15/20

[52] U.S. Cl. ................................... 364/518; 340/724; 382/45

[58] Field of Search ................ 364/518, 521; 340/703, 340/724, 729, 734; 382/44-48

[56] References Cited

U.S. PATENT DOCUMENTS

| | | | |
|---|---|---|---|
| 4,056,713 | 11/1977 | Quinn | 364/521 |
| 4,074,359 | 2/1978 | Hasenbalg | 364/521 |
| 4,272,808 | 6/1981 | Hartwig | 364/718 |
| 4,607,340 | 8/1986 | Nagai | 364/521 |
| 4,649,506 | 3/1987 | Van Den Heuvel | 364/521 X |

OTHER PUBLICATIONS

Llewelyn et al., "Generation of Points Using Bresenham's Algorithm", IBM Technical Disclosure Bulletin, vol. 20, No. 9, Feb. 1978, pp. 3703-3706.

*Primary Examiner*—Heather R. Herndon
*Attorney, Agent, or Firm*—William A. Kinnaman, Jr.; Mark S. Walker; George E. Clark

[57] ABSTRACT

Method and apparatus for setting up a graphics vector generator. Computing values representative of difference functions between delta Y values and delta X values for a vector to be drawn; storing such functions; and storing a sign of said difference functions for controlling X, Y, swap and multiplex operations. An X, Y, swap for swapping x values and Y values in response to said sign storage to present a larger of an X function or a Y function to a control means for controlling a number of iterations in generation of a vector and iteration counter for controlling a number of iterations in generation of a vector.

15 Claims, 3 Drawing Sheets

A RASTER GRAPHICS SYSTEM

GRAPHICS VECTOR GENERATOR SETUP TECHNIQUE

This is a continuation of application Ser. No. 820,763, filed Jan. 17, 1986, now abandoned.

BACKGROUND OF THE INVENTION

1. Field of the Invention

The present invention relates to information handling systems and more particularly to information handling systems including method and apparatus for reducing set up overhead in a vector generator of a graphics display system.

2. Description of the Prior Art

The following is an example of a prior art vector generator set up technique.

In the Bresenham vector generation, described in J. E. Bresenham, "Algorithm for Computer Control of Digital Plotter", IBM Systems Journal, Volume 4, No. 1, 1965, Pages 25–30, and "Fundamental of Interactive Computer Graphics," J. T. Foley and Andries Van Dam, Addision Wesley Publishing Company, 1982 at pages 433 to 436, a number of computations are required prior to the start of line generation. This process is called vector generator setup. The present invention describes an improved implementation of a Bresenham vector generator which requires only two clock cycles to perform the setup operation. The prior art Bresenham vector generator setup normally required either four or five clock cycles. Thus the present invention saves at least fifty percent of the setup time.

SUMMARY OF THE INVENTION

Therefore, it is an object of the present invention to setup a graphics vector generator by apparatus and method including means for computing values representative of difference functions between Delta Y values and Delta X values for a vector to be drawn; means for storing such functions; means for storing a sign of said difference functions for controlling X, Y, swap and multiplex operations; X, Y, swap means for swapping X values and Y values in response to said sign storage to present a larger of an X function or a Y function to a control means for controlling a number of iterations in generation of a vector; and iteration counter means for controlling a number of iterations in generation of a vector.

It is a further object of the present invention to setup a graphics vector generator as above by apparatus and method further including means for determining an absolute value for each of said delta X and delta Y values.

It is yet another object of the present invention to setup a graphics vector generator as above by apparatus and method further including means for multiplying said absolute values by a predetermined factor.

The foregoing and other objects, features and advantages of the invention will be apparent from the more particular description of the preferred embodiments of the invention, as illustrated in the accompanying drawing.

BRIEF DESCRIPTION OF THE DRAWINGS

In the drawings, like elements are designated with similar reference numbers, and identical elements in different specific embodiments are designated by identical reference numbers.

DESCRIPTION OF PREFERRED EMBODIMENTS OF THE INVENTION

A Raster Graphics System

Figure 1:
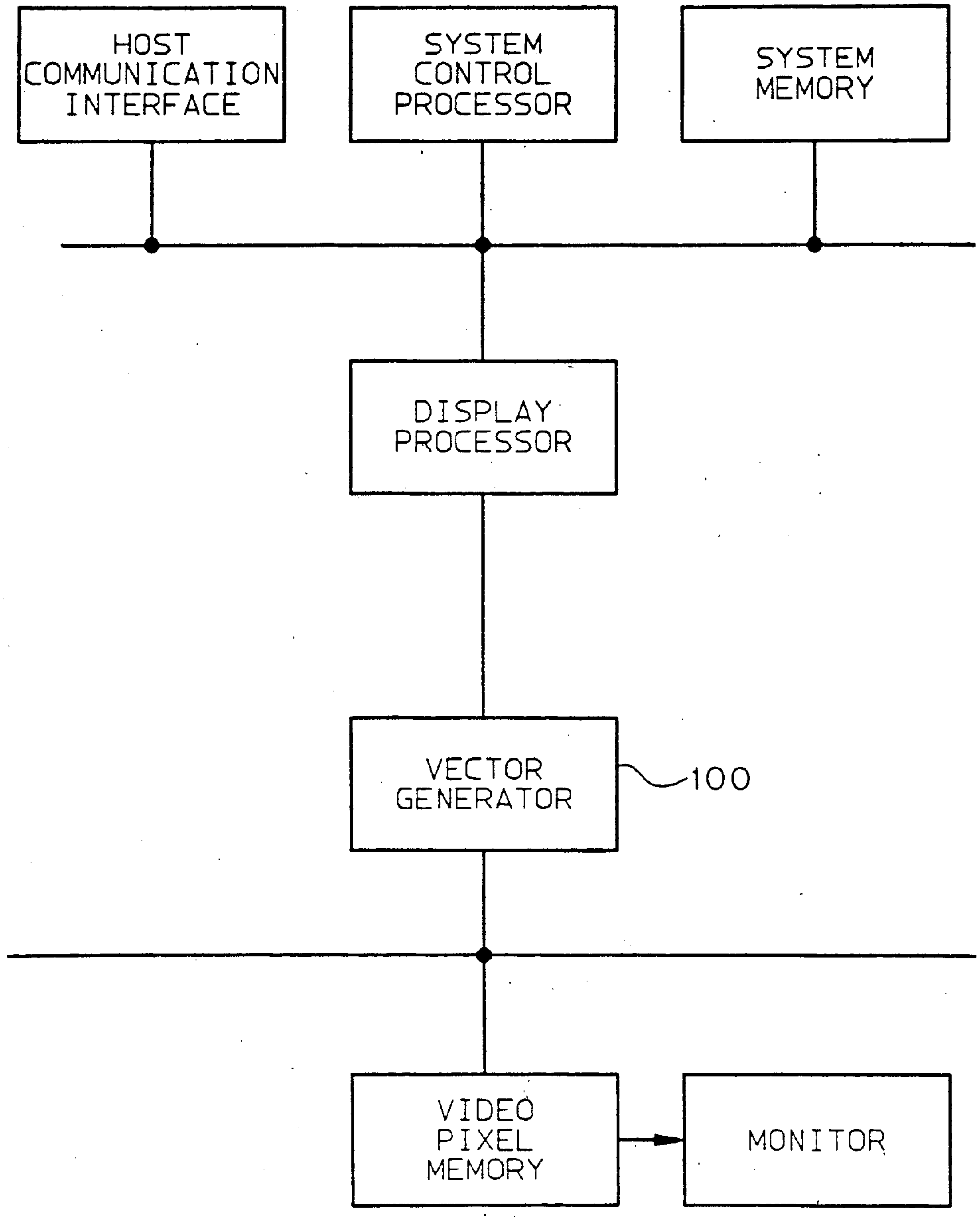
FIG. 1 is a block diagram of a raster graphic system embodying a vector generator according to the present invention.

Consider the raster graphics system in FIG. 1.

It consists of the following major components:

1. System Control Processor
2. Host Communication Interface Processor
3. Display Processor
4. Hardware Rasterizer - Vector Generator
5. Video Pixel Memory
6. System Memory

FUNCTIONS OF MAJOR COMPONENTS

Each of the major components to be described may be implemented by elements of commercially available display systems such as the IBM 5080.

1. System Control Processor

The System Control Processor is a general purpose processor that has master control of the System. The System Control Processor is responsible for servicing all attached Graphics I/0 devices Coordinating the associated processing with the Display Processor the System Control Processor interfaces with the host via Host Communication Interface 2. Host Communication Interface The Host Communication Interface provides the serial interface of the System to the host.

3. Display Processor

The DP is responsible for executing graphics orders in the Display Storage Program, residing in the system memory and is concerned mainly with the generation of the image that will appear on the Display Monitor. It has the following functions:

Decoding graphics orders and executing non-drawing orders; e.g. book keeping and control.

Performing the transformation and clipping function to the geometric primitives: lines, characters, polygons, etc.

Preparing the following geometric objects for display: lines, characters, markers, filled polygons, by preprocessing and feeding the data to the Vector generator and Video Pixel Memory 4. Vector generator Vector generator 100 is a Hardware Implementation of the Bresenham Line Generating algorithm, which takes the end points of a vector (line) as input, and generates pixels in the Video Pixel Memory as output for display.

5. Video Pixel Memory

Video Pixel Memory consists of 8 1 k by 1 k bit planes, which supports 256 colors simultaneously via color look-up tables. The image stored here will be displayed in the Monitor.

PREFERRED EMBODIMENT OF THE INVENTION

Figure 2:
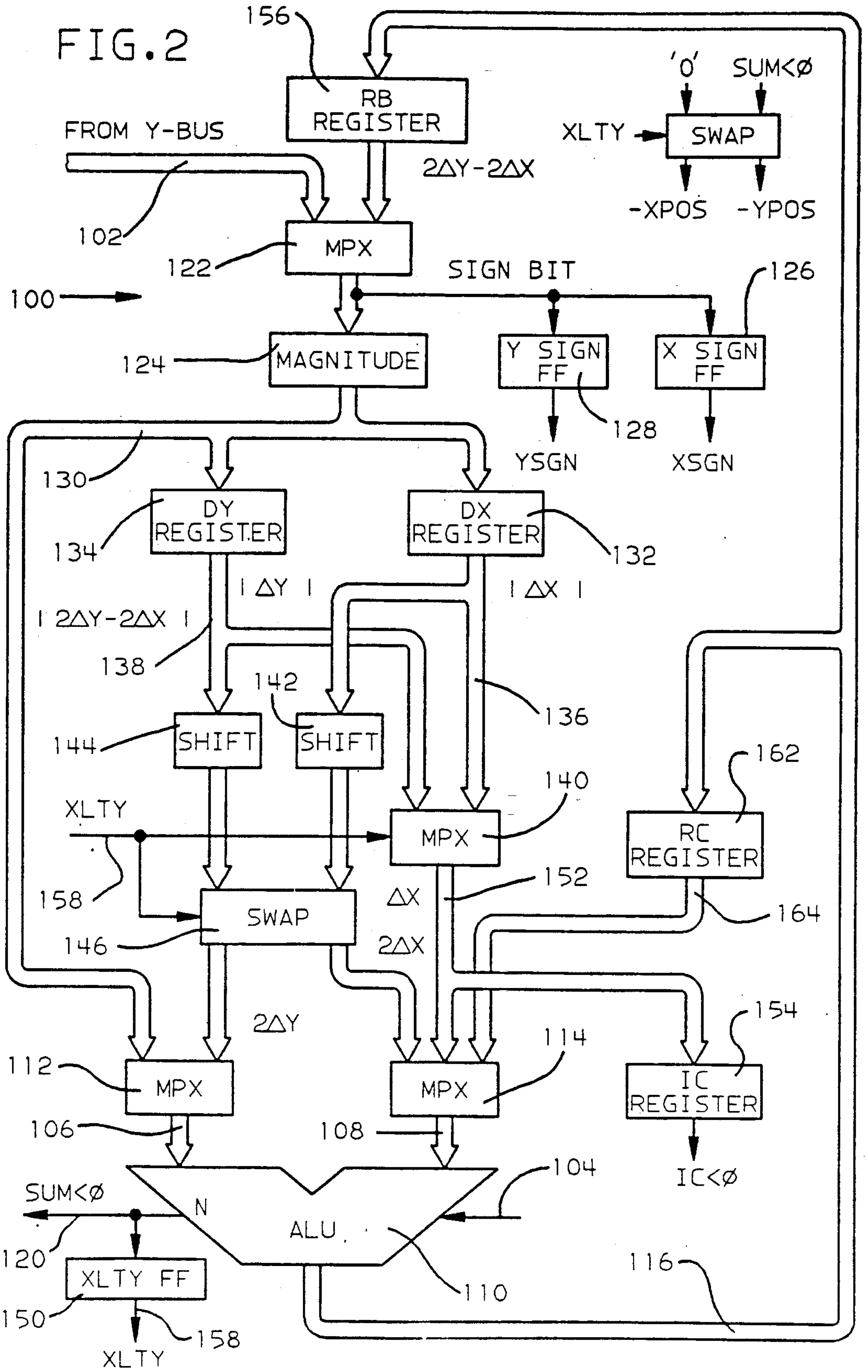
FIG. 2 is a block diagram of a vector generator employing the set up technique according to the present invention.

The present invention is in a technique for efficiently performing Vector Generator set up and will be described in more detail with reference to FIGS. 2 and 3.

At the heart of vector generator 100 is Arithmetic Logic Unit (ALU) 110 having bus inputs 106 (left) and 108 (right) from multiplexers 112 and 114 respectively and having a bus output 116 and a sign bit 120 at N indicating SUM<0 when active.

Delta X and delta Y values are input to vector generator 100 on bus 102 which provides a first input to multiplexer 122. During a first time period, multiplexer 122 is enabled by sequence logic of a display controller such as IBM 5080 (not shown) so that the data on bus 102 is fed through absolute magnitude logic 124 which determines the absolute magnitude of the value of either delta X of delta Y appearing on bus 102 at any period of time. A sign bit output of multiplexer 122 is also fed to inputs to X sign flip flop 126 and Y sign flip flop 128. The appropriate sign flip flop to be activated by the sign bit output from multiplexer 122 is enabled by the sequencer not shown. The output of absolute magnitude logic 124 is fed on bus 130 to inputs to delta X register 132, delta Y register 134 and left ALU multiplexer 112.

Next, a value for delta Y is placed on bus 102 and is fed through multiplexer 122 where the sign bit is identified and used to activate Y sign flip flop 128. The magnitude of delta Y is then determined by magnitude logic 124 and the absolute magnitude of delta Y is loaded into delta Y register 134.

The delta X output from delta X register 132 is fed on bus 136 to multiplexer 140 and to hard wired two times multiplier 142. The magnitude of the delta Y output of delta Y register 134 is fed on bus 138 to a second input of multiplexer 140 and to hard wired two times multiplier 144.

During a first pass, the output of multiplier 142 now represents 2 delta X and the output of multiplier 144 represents 2 delta Y.

During vector generator setup, X less than Y flip flop 150 is initialized so that X less than Y output 158 is zero, which assumes that delta X is greater than or equal to delta Y. X less than Y line 158 controls swap logic 146 and multiplexer 140. In the initial state, with line 158 equal to zero, there is no swap performed thus the output of multiplier 142 is fed through to a left-most input of multiplexer 114 which is the right-hand multiplexer for ALU 110 and the output of multiplier 144 is fed through swap logic 146 to a right-input of multiplexer 112 which is the left-hand input to ALU 110.

Similarly, the output of multiplexer 140 representing at this time the absolute magnitude of delta X, on bus 152 is fed to a second input of multiplexer 114 and into an input of iteration counter 154. A first computation to be performed by ALU 110 is the operation 2 delta Y minus 2 delta X. The subtraction is controlled by ALU control line 104 from the graphics processor sequencer. The output of the ALU on bus 116 is inputted to RB register 156 which now stores the quantity 2 delta Y minus 2 delta X.

Also as a result this computation, the sign bit of the result which appears at line 120 is stored in the X less than Y flip flop 150 which provides the active control line 158 to swap logic 146 and multiplexer 140.

Line 158 controls the inputs to multiplexer 112 and 114 respectively such that if line 158 is active, 2 delta X is fed to multiplexer 112 and 2 delta Y is fed to multiplexer 114 resulting in an actual computation of 2 delta X minus 2 delta Y rather than 2 delta Y minus 2 delta X.

Of course, the ALU merely subtracts the inputs presented on lines 108 from the inputs presented on lines 106 to achieve the desired result.

In the next cycle, 2 delta Y appearing on lines 106 is fed to the left side of ALU 110 and delta X from multiplexer 140 through multiplexer 114 under the control of the graphics processor sequencer is fed on lines 108 the right side of ALU 110 so that the output on bus 116 is the quantity 2 delta Y minus delta X.

This quantity is fed to RC register 162 where it is stored.

The output 164 of RC register 162 is a third input to multiplexer 114 which feeds the right side of ALU 110.

Vector generator setup is complete at this point. During vector generator setup, ALU 110 performs only subtraction operations in each of the two cycles of setup.

OPERATION

The operation of the setup technique according to the present invention, will now be described with reference to the state diagram shown in FIG. 3.

The vector generator is in the idle condition state 0 until a start signal is received at which point the system moves to state 1.

In state 1, the quantity 2 delta Y minus 2 delta X is calculated by ALU 100 based upon inputs received as described above with reference to FIG. 2 and the value is stored in RB register 156. Also, in state 1 the X less than Y flip flop 150 is set based upon the value of (sum less than zero) line 120. Next, the system unconditionally moves to state 2 at which point a second setup step takes the quantity two delta Y through multiplexer 112 and delta X through multiplexers 140 and 114 and ALU 110 calculates the quantity 2 delta Y minus delta X which is then stored in RC register 162 as the error term. At this point, the iteration counter 154 is set to the value of delta X.

Figure 3:
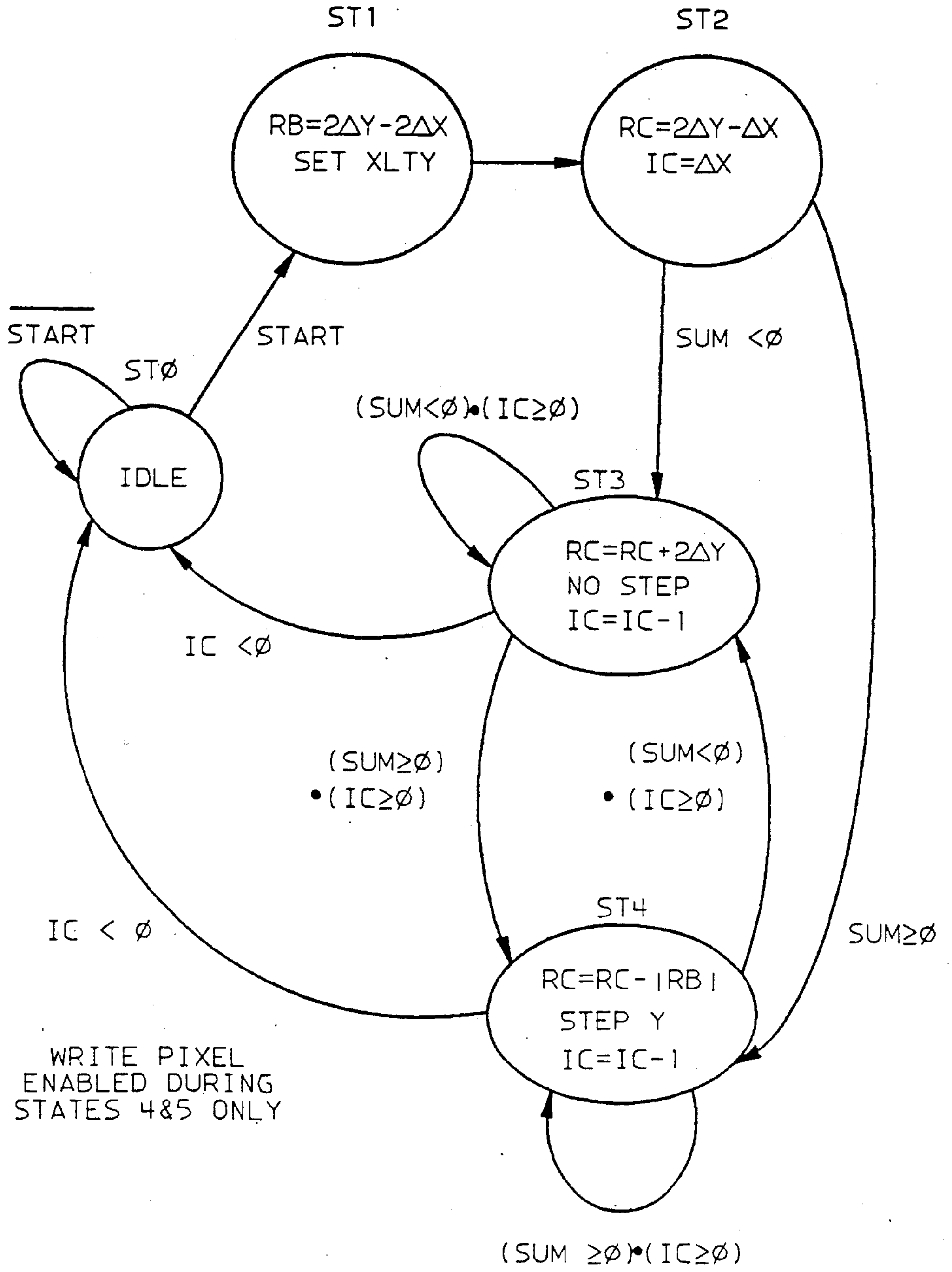
FIG. 3 is a state diagram of a vector generator set up technique in accordance with the present invention.

States 1 and 2 as shown in FIG. 3 complete the vector generator setup procedure in accordance with the present invention. States 3 and 4 to be discussed below describe the "normal" Bresenham line generation technique that is known in the prior art. If the (sum less than zero) line is active, the system moves from state 2 to state 3 and the next value of 2 delta Y is added to the error term stored in RC register 162 and the result is put back into RC register 162. Iteration counter 154 is decremented by one and the system may continue to generate pixels in state 3 as long as the sum less than zero line is active and the iteration counter is greater than or equal to zero which indicates that there are more pixels to be drawn along the X axis of the line being drawn with no Y increment.

If the (sum less than zero) line becomes zero for any particular pixel to be drawn, and the iteration counter is not less than zero, the system moves from state 3 to state 4 at which point the absolute value of the quantity stored in RB register 156 is subtracted from the value of the error stored in RC register 162 with the result being stored back in RC register 162. The Y value is incremented and the iteration counter is decreased by one.

If the next pixel also indicates a sum less than zero in active, indicating a further Y coordinate increment, the system loops in state 4 until such Y steps have been completed. When the (sum less than zero) line becomes active again, the system returns control to state 3 and additional pixels are drawn as described above until the iteration counter becomes less than zero at which time the process is terminated and control returns to the idle state zero.

If after the second setup state, state 2, the (sum less zero) line is inactive, indicating a Y increment, then control is passed directly from state 2 to state 4 and the first pixel to be drawn is controlled by state 4 rather than state 2 and the process continues as described above.

The method of the present invention provides a more efficient method for setting up a vector generator by reducing the number of setup states from 4 or 5 in the prior art to the two setup states required by the method and apparatus of the present invention.

Thus, while the invention has been described with reference to preferred embodiments thereof, it will be understood by those skilled in the art that various changed in form and details may be made without departing from the scope of the invention.

What is claimed is:

1. In a Bresenham vector generator for generating a pixel approximation of a vector (ΔX, ΔY), said generator having an arithmetic logic unit (ALU) and first and second registers, apparatus for generating an initial error term (2ΔY−ΔX) and a correction term (2ΔY−2ΔX) comprising means for generating the quantities ΔX, 2ΔX and 2ΔY, where ΔX and ΔY are the components of said vector along predetermined axes, means for supplying said quantities 2ΔY and 2ΔX to said ALU on a first clock cycle to obtain said correction term (2ΔY−2ΔX), means for storing said correction term in said first register, means for supplying said quantities 2ΔY and ΔX to said ALU on a second clock cycle to obtain an initial error term (2ΔY−ΔX), means for storing said initial error term in said second register, and means operable on each subsequent clock cycle for supplying the error term stored in said second register to said ALU as a first input, selectively supplying the quantity 2ΔY or the correction term stored in said first register as a second input in accordance with the sign of the current error term stored in said second register, and storing the result in said second register.

2. Apparatus as in claim 1 in which said generating means comprises respective third and fourth registers for storing said quantities ΔX and ΔY and respective multipliers coupled to said registers.

3. Apparatus as in claim 2 in which said multipliers are shifters.

4. Apparatus as in claim 1 in which said quantities ΔX, 2ΔX and 2ΔY are absolute values.

5. Apparatus as in claim 1, further comprising means for generating the quantity ΔY, said second supplying means being selectively operable to supply the quantity 2ΔY or 2ΔX to one input of said ALU and the quantity ΔX or ΔY to the other input of said ALU in accordance with the sign of said correction term (2ΔY−2ΔX).

6. Apparatus as in claim 1 in which said ALU is operable on said subsequent clock cycles to subtract said second input from said first input.

7. Apparatus as in claim 1 in which said means operable on each subsequent clock cycle supplies the absolute value of the correction term stored in said first register to said ALU as a second input.

8. In a Bresenham vector generator for generating a pixel approximation of a vector (ΔX, ΔY) said generator having an arithmetic logic unit (ALU) and first and second registers, a method of generating an initial error term (2ΔY−ΔX) and a correction term (2ΔY−2ΔX) comprising generating the quantities ΔX, 2ΔX and 2 ΔY, where ΔX and ΔY are the components of said vector along predetermined axes, supplying said quantities 2ΔY and 2ΔX to said ALU on a first clock cycle to obtain said correction term (2ΔY−2ΔX), storing said correction term in said first register, supplying said quantities 2ΔY and ΔX to said ALU on a second clock cycle to obtain an initial error term (2ΔY−ΔX) storing said initial error term in said second register, and,.on each subsequent clock cycle, supplying the error term stored in said second register to said ALU as a first input, selectively supplying the quantity 2ΔY or the correction term stored in said first register as a second input in accordance with the sign of the current error term stored in said second register, and storing the result in said second register.

9. Apparatus as in claim 8 in which said generating step comprises the steps of storing said quantities ΔX and ΔY in binary form and shifting said quantities to obtain the quantities 2ΔX and 2ΔY.

10. A method as in claim 8 in which said quantities ΔY, 2ΔX and 2ΔY are absolute values.

11. A method as in claim 8, further comprising the step of generating the quantity ΔY, said second supplying step comprising the step of selectively supplying the quantity 2ΔY or 2ΔX to one input of said ALU and the quantity ΔX or ΔY to the other input of said ALU in accordance with the sign of said correction term (2ΔY−2ΔX).

12. A method as in claim 8 in which said ALU is operable on said subsequent clock cycles to subtract said second input from said first input.

13. A method as in claim 8 in which the absolute value of the correction term stored in said first register is supplied to said ALU as a second input.

14. In a Bresenham vector generator for generating a pixel approximation of a vector (ΔX, ΔY), said generator having an arithmetic logic unit (ALU) and first and second registers, apparatus for generating an initial error term and a correction term comprising means for generating the quantities ΔX,·ΔY, 2ΔX and 2ΔY, where ΔX and ΔY are the components of said vector along predetermined axes, means for supplying said quantities 2ΔY and 2ΔX to said ALU on a first clock cycle to obtain a correction term n2ΔY−2ΔX), means for storing said correction term in said first register, means for supplying a selected pair of said quantities ΔX, ΔY, 2ΔX and 2ΔY to said ALU on a second clock cycle to obtain an initial error term, said second supplying means supplying the quantity 2ΔY or 2ΔX to one input of said ALU and the quantity ΔX or ΔY to the other input of said ALU in accordance with the sign of said correction term (2ΔY−2ΔX), and means for storing said initial error term in said second register.

15. In a Bresenham vector generator for generating a pixel approximation of a vector (ΔX, ΔY) said generator having an arithmetic logic unit (ALU) and first and second registers, a method of generating an initial error term and a correction term comprising generating the quantities ΔX, ΔY, 2ΔX and 2ΔY, where ΔX and ΔY are the components of said vector along predetermined axes, supplying said quantities 2ΔY and 2ΔX to said ALU on a first clock cycle to obtain a correction term (2ΔY−2ΔX), storing said correction term in said first register, supplying a selected pair of said quantities ΔX; ΔY, 2ΔX and 2ΔY to said ALU on a second clock cycle to obtain an initial error term, the quantity 2ΔY or 2ΔX being supplied to one input of said ALU and the quantity of ΔX or ΔY being supplied to the other input of said ALU in accordance with the sign of said correction term (2ΔY−2ΔX), and storing said initial error term in said sescond register.

* * * * *